(12) United States Patent
Hsu et al.

(10) Patent No.: US 10,104,399 B2
(45) Date of Patent: Oct. 16, 2018

(54) METHOD AND APPARATUS FOR UNIFICATION OF COEFFICIENT SCAN OF 8X8 TRANSFORM UNITS IN HEVC

(71) Applicant: HFI Innovation Inc, Zhubei, Hsinchu County (TW)

(72) Inventors: Chih-Wei Hsu, Taipei (TW); Tzu-Der Chuang, Hsinchu County (TW); Yu-Wen Huang, Taipei (TW)

(73) Assignee: HFI INNOVATION INC., Zhubei, Shinchu County (TW)

( * ) Notice: Subject to any disclaimer, the term of this patent is extended or adjusted under 35 U.S.C. 154(b) by 275 days.

(21) Appl. No.: 14/371,414

(22) PCT Filed: Sep. 20, 2012

(86) PCT No.: PCT/CN2012/081628
§ 371 (c)(1),
(2) Date: Jul. 9, 2014

(87) PCT Pub. No.: WO2013/104198
PCT Pub. Date: Jul. 18, 2013

(65) Prior Publication Data
US 2015/0010072 A1    Jan. 8, 2015

Related U.S. Application Data

(60) Provisional application No. 61/586,248, filed on Jan. 13, 2012.

(51) Int. Cl.
*H04N 19/61* (2014.01)
*H04N 19/63* (2014.01)
(Continued)

(52) U.S. Cl.
CPC .......... *H04N 19/63* (2014.11); *H04N 19/129* (2014.11); *H04N 19/157* (2014.11)

(58) Field of Classification Search
None
See application file for complete search history.

(56) References Cited

U.S. PATENT DOCUMENTS

| | | | |
|---|---|---|---|
| 2010/0182668 A1* | 7/2010 | Abe | G02B 26/101 359/202.1 |
| 2011/0096834 A1* | 4/2011 | Cheon | H04N 19/119 375/240.12 |

(Continued)

FOREIGN PATENT DOCUMENTS

| | | |
|---|---|---|
| CN | 1642278 A | 7/2005 |
| CN | 1655622 A | 8/2005 |

(Continued)

OTHER PUBLICATIONS

Nguyen et al., "Improved Context Modeling for Coding Quantized Transform Coefficients in Video Compression," Dec. 8-10, 2010, 28th Picture Coding Symposium, pp. 378-381.*

(Continued)

*Primary Examiner* — Edemio Navas, Jr.
(74) *Attorney, Agent, or Firm* — Oblon, McClelland, Maier & Neustadt, L.L.P.

(57) ABSTRACT

A method and apparatus for processing 2N×2N transform units (TUs) are disclosed. In one embodiment, the method comprises determining a first-layer scanning order among four N×N sub-blocks of the 2N×2N TU; determining a second-layer scanning pattern for said four N×N sub-blocks; and providing scanned 2N×2N transform coefficients of the intra-coded or the inter-coded 2N×2N TU using double scanning based on the first-layer scanning order and the second-layer scanning pattern. In another embodiment, said determining the first-layer scanning order is dependent on the second-layer scanning pattern. The second-layer scanning pattern can be diagonal, horizontal or vertical. In an embodiment, the first-layer scanning order can be from an (Continued)

upper-left sub-block, to an upper-right sub-block, to a lower-left sub-block and to a lower-right sub-block for the second-layer horizontal scanning pattern and from an upper-left sub-block, to a lower-left sub-block, to an upper-right sub-block and to a lower-right sub-block for other second-layer scanning patterns.

16 Claims, 4 Drawing Sheets

(51) Int. Cl.
*H04N 19/129* (2014.01)
*H04N 19/157* (2014.01)

(56) References Cited

U.S. PATENT DOCUMENTS

| | | | |
|---|---|---|---|
| 2011/0274162 A1 | 11/2011 | Zhou et al. | |
| 2012/0121011 A1* | 5/2012 | Coban | H04N 19/176 375/240.03 |
| 2013/0107970 A1* | 5/2013 | Wang | H04N 19/176 375/240.18 |

FOREIGN PATENT DOCUMENTS

| | | | | |
|---|---|---|---|---|
| JP | 2007174569 A | | 7/2007 | |
| WO | 2007079782 A1 | | 7/2007 | |
| WO | WO 2007/079782 | * | 7/2007 | H04N 7/26 |
| WO | WO 2013/106887 | | 7/2013 | |

OTHER PUBLICATIONS

McCann, K., et al.; "Samsung's Response to the Call for Proposals on Video Compression Technology;" Joint Collaborative Team on Video Coding (JCT-VC) of ITU-T SG16 and ISO/IEC JTC1/SC29/WG11; Apr. 2010; pp. 1-42.

Sole, J., et al.; "Removal of the 8×2 and 2×8 coefficient groups;" Joint Collaborative Team on Video Coding (JCT-VC) of ITU-TSG 16 WP 3 and ISO/IEC JTC 1/SC 29/WG 11; Jul. 2012; pp. 1-3.

Rosewarne, C., et al.; "Non-CE11 Harmonisation of 8×8 TU residual scan;" Joint Collaborative Team on Video Coding (JCT-VC) of ITU-T SG 16 WP 3 and ISO/IEC JTC 1/SC 29/WG 11; Feb. 2012; pp. 1-5.

Hsu, C.W., et al.; "Non-CE11 unification of transform coefficient coding;" Joint Collaborative Team on Video Coding (JCT-VC) of ITU-T SG 16/WP 3 and ISO/IEC JTC 1/SC 29/WG 11; Feb. 2012; pp. 1-8.

Nguyen, T., et al.; "Improved context modeling for coding quantized transform coefficients in video compression;" 28th Picture Coding Symposium; Dec. 2010; pp. 378-381.

Sole, J., et al.; "Non-CE11 diagonal sub-block scan for HE residual coding;" Joint Collaborative Team on Video Coding (JCT-VC) of ITU-T SG 16 WP 3 and ISO/IEC JTC 1/SC 29/WG 11; Nov. 2011; pp. 1-4.

Zhao, X., et al.; "Extended mode-dependent coefficient scanning;" Joint Collaborative Team on Video Coding (JCT-VC) of ITU-TSG 16 WP 3 and ISO/IEC JTC 1/SC 29/WG 11; Jul. 2011; pp. 1-9.

Choi, B.D., et al.; "Adaptive coefficient scanning based on the Intra Prediction Mode;" ETRI Journal; vol. 29; No. 5; Oct. 2007; pp. 694-696.

Baek, S.J., et al.; "Adaptive coefficient scanning based on universal prediction;" Electronics Letters; vol. 45; No. 25; Dec. 2009; pp. 1-2.

McCann, K., et al.; "High efficiency video coding HEVC test model 5 encoder description;" Joint Collaborative Team on Video Coding (JCT-VC) of ITU-T SG 16 WP 3 and ISO/IEC JTC 1/SC 29/WG 11; Nov. 2011; pp. 1-45.

Office Action dated Apr. 24, 2017, in Chinese Patent Application No. 201280066400.1.

Joel Sole, et al., "Non-CE11: Diagonal Sub-Block Scan for HE Residual Coding", Joint Collaborative Team on Video Coding (JCT-VC) of ITU-T SG16 WP3 and ISO/IEC JTC1/SC29/WG11, Nov. 21-30, 2011, 10 pages.

\* cited by examiner

METHOD AND APPARATUS FOR UNIFICATION OF COEFFICIENT SCAN OF 8X8 TRANSFORM UNITS IN HEVC

CROSS REFERENCE TO RELATED APPLICATIONS

The present invention claims priority to U.S. Provisional Patent Application, Ser. No. 61/586,248, filed on Jan. 13, 2012, entitled "Unification of coefficient scan for 8×8 TU". The U.S. Provisional Patent Application is hereby incorporated by reference in its entirety.

BACKGROUND OF THE INVENTION

Field of the Invention

The present invention relates to video coding. In particular, the present invention relates to coding techniques for coefficient scan of 8×8 transform units in High Efficiency Video Coding (HEW).

Description of the Related Art

HEVC (High Efficiency Video Coding) is an advanced video coding system being developed under the Joint Collaborative Team on Video Coding (JCT-VC) group of video coding experts from ITU-T Study Group. In HEVC, a 2N×2N coding unit (CU) can be hierarchically partitioned into a partition size selected from 2N×2N, 2N×N, N×2N and N×N. The current HEVC also defines the prediction unit (PU), where a CU may consist of one or multiple PUs. After prediction process is performed on each CU, the residues of each CU are further processed by transformation. In HEVC Test Model Version 5.0 (HM-5.0), transform coefficients of each transform unit (TU) are quantized and then scanned according to as certain scan pattern before Context-adaptive binary arithmetic coding (CABAC). For intra coded transform coefficients, the mode-dependent coefficient scan (MDCS) method is used. Three scan patterns, including diagonal 110, horizontal 120, and vertical scanning 130, as illustrated in FIG. 1, are used to scan the coefficients. A transform unit usually contains some zero-valued quantized transform coefficients in the high frequency region for typical image contents. The scanned coefficients may contain a string of zero-values data at the end. One effective way to code the scanned transform coefficients is to identify and code the string of zeros at the end of scanned transform coefficients. Therefore, the scanned coefficients are often examined from the end toward the beginning to identify number of consecutive zero-valued data at the end of the scanned coefficients. Based on the number of consecutive zero-valued data at the end of the scanned transform coefficients, the consecutive zero-valued data can be coded very efficiently. The number of consecutive zero-valued data at the end of the scanned transform coefficients can be identified by the last non-zero coefficient. In HEVC Test Model Version 5.0 (HM-5.0), the selection of the scan patterns for each intra-coded TU can be based on the intra prediction modes, as shown in Table 1, where 0, 1, and 2 correspond to for diagonal, horizontal, and vertical scan patterns respectively. In HM-5.0, MDCS is only used for intra TUs with sizes of 4×4 and 8×8 as shown in Table 1, while for inter-coded coefficients, only diagonal scanning is used for inter 4×4 and 8×8 TUs.

TABLE 1

| Intra Mode TU size | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 32 × 32 | 0 | 0 | 0 | 0 | 0 | 0 | 0 | 0 | 0 | 0 | 0 | 0 | 0 | 0 | 0 | 0 | 0 | 0 |
| 16 × 16 | 0 | 0 | 0 | 0 | 0 | 0 | 0 | 0 | 0 | 0 | 0 | 0 | 0 | 0 | 0 | 0 | 0 | 0 |
| 8 × 8 | 0 | 1 | 2 | 0 | 0 | 1 | 1 | 0 | 2 | 2 | 0 | 0 | 1 | 1 | 0 | 0 | 2 | 2 |
| 4 × 4 | 0 | 1 | 2 | 0 | 0 | 1 | 1 | 0 | 2 | 2 | 0 | 0 | 1 | 1 | 0 | 0 | 2 | 2 |

| Intra Mode TU size | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 32 × 32 | 0 | 0 | 0 | 0 | 0 | 0 | 0 | 0 | 0 | 0 | 0 | 0 | 0 | 0 | 0 | 0 | 0 |
| 16 × 16 | 0 | 0 | 0 | 0 | 0 | 0 | 0 | 0 | 0 | 0 | 0 | 0 | 0 | 0 | 0 | 0 | 0 |
| 8 × 8 | 0 | 0 | 0 | 1 | 1 | 1 | 1 | 0 | 0 | 0 | 0 | 2 | 2 | 2 | 2 | 0 | 0 |
| 4 × 4 | 0 | 0 | 0 | 1 | 1 | 1 | 1 | 0 | 0 | 0 | 0 | 2 | 2 | 2 | 2 | 0 | 0 |

As shown in Table 1, diagonal scan pattern is applied to intra-coded 16×16 and 32×32 TUs, while different scan patterns are selectively applied to intra-coded 4×4 and 8×8 TUs.

After transform coefficients are re-ordered according to a scan pattern, CABAC compression is applied to the scanned transform coefficients on a TU by TU basis. In each TU, a last_significant_coeff_x and a last_significant_coeff_y are transmitted first to indicate the last non-zero coefficient position in the predetermined scan order. The TU is then divided into several subsets when the TU size is larger than 4×4. The subsets in the TU are retrieved for coding operation one by one. For one 8×8 TU, the 64 coefficients are divided into 4 subsets according to the diagonal scan through the entire 8×8 TU. Each subset contains 16 continuous coefficients. FIG. 2 shows the 4 subsets in an 8×8 TU as indicated by four different shaded patterns. For square TUs larger than 8×8 (e.g. 16×16 and 32×32) and non-square TUs (e.g. 16×4, 4×16, 32×8, and 8×32), the TU is divided into 4×4 sub-blocks. Each sub-block corresponds to a coefficient subset. For each subset, a significance map (significant_coeff_flag) indicating whether each coefficient is zero or not is coded first. Next, coeff_abs_level_greater1_flag, coeff_abs_level_greater2_flag, coeff_abs_level_minus3, and coeff_sign_flag are utilized to represent each non-zero coefficient. In HM-5.0, if the TU size equals to 16×16, 32×32, 16×4, 4×16, 32×8, or 8×32, one significant_coeff-group_flag is coded for each sub-block prior to the level, coding of the sub-block (e.g. the significant_coeff_flag, coeff_abs_level_greater1_flag, coeff_abs_level_greater2_flag, coeff_abs_level_minus3, and coeff_sign_flag). If significant_coeffgroup_flag equals to 0, it indicates that the entire 4×4 sub-block is zero. The level coding of the sub-block with zero for the entire 4×4 sub-block can be skipped. The significant_coeffgroup_flag is inferred as 1 for the DC sub-block.

In one TU, transform coefficients are divided into multiple subsets and similar CABAC coding operations are applied to each subset. However, in HM-5.0, there are two kinds of subset partitioning using diagonal scanning. One is to partition the scanned transform coefficients of the 8×8 TU using diagonal scanning into multiple subsets, and the other is to partition the scanned transform coefficients of the 8×8 TU into multiple subsets using double diagonal scanning. In the latter case, each subset corresponds to a 4×4 sub-block. From implementation point of view, it is preferable to unify the subset partition methods in order to reduce system complexity and cost.

BRIEF SUMMARY OF THE INVENTION

A method and apparatus for processing 2N×2N transform units are disclosed. In one embodiment according to the present invention, the method for processing 2N×2N transform units comprises receiving a 2N×2N TU (transform unit), determining a first-layer scanning order among four N×N sub-blocks of the 2N×2N TU; determining a second-layer scanning pattern for said four N×N sub-blocks; and providing scanned 2N×2N transform coefficients for the 2N×2N TU corresponds to the intra-coded TU or the inter-coded TU using double scanning based on the first-layer scanning order and the second-layer scanning pattern. The four N×N sub-blocks of the 2N×2N TU are scanned based on the first-layer scanning order and each of said four N×N sub-blocks is scanned according to the second-layer scanning pattern.

The first-layer scanning order scans an upper left N×N sub-block first and scans a lower right N×N sub-block last. Furthermore, in some embodiments of the present invention, said determining the first-layer scanning order can be dependent on the second-layer scanning pattern. The second-layer scanning pattern is selected from a second group consisting of diagonal scanning, horizontal scanning and vertical scanning. The first-layer scanning order can be from an upper-left sub-block, to an upper-right sub-block, to a lower-left sub-block and to a lower-right sub-block if the second-layer scanning pattern is the horizontal scanning. The first-layer scanning order can be from an upper-left sub-block, to a lower-left sub-block, to an upper-right sub-block and to a lower-right sub-block if the second-layer scanning pattern is the diagonal scanning or the vertical scanning. In yet another embodiment of the present invention, said determining the second-layer scanning pattern is dependent on an intra prediction mode associated with the 2N×2N TU if the 2N×2N TU is the intra-coded TU.

DETAILED DESCRIPTION OF THE INVENTION

As mentioned previously, for an Ultra-coded 8×8 TU in HM-5.0, the coefficients scanning is applied to the entire 8×8 TU using one a three possible scanning patterns according to intra prediction modes, and for an inter-coded 8×8 TU, diagonal scanning is applied to the entire 8×8 TU. An embodiment according to the present invention unifies the coefficient scan for 8×8 TUs with larger TU size and non-square TUs. Therefore, instead of using diagonal, horizontal, or vertical scanning for the entire 8×8 TU, an 8×8 TU is also partitioned into four 4×4 sub-blocks. Double scanning is used for the intra-coded or inter-coded 8×8 TU. Accordingly, 4×4 sub-blocks are used as subsets for coefficient scanning of intra-coded 8×8 TU and inter-coded 8×8 TU. An example of double diagonal scanning for inter-coded and intra-coded 8×8 TU is shown as pattern 310 in FIG. 3. When MDCS is used, there are two additional scan patterns, including horizontal and vertical scanning, for the entire 4×4 and 8×8 TUs. In another embodiment of the present invention, the horizontal scan pattern and the vertical scan pattern are also used for the 4×4 sub-blocks. Accordingly, the 8×8 TU is divided into four 4×4 sub-blocks and double horizontal scanning 320 or double vertical scanning 330 can be used as shown in FIG. 3.

Figure 1:
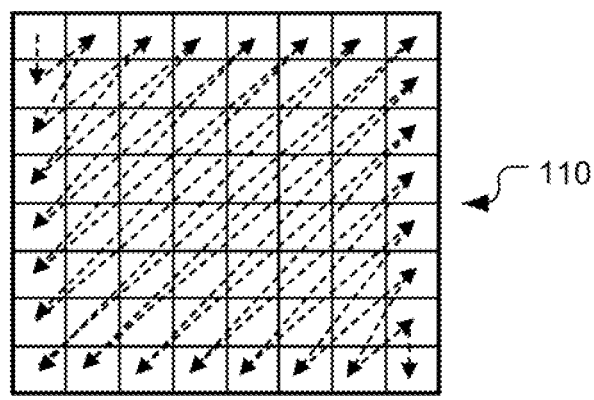
FIG. 1 illustrates mode-dependent coefficient scan patterns for an intra-coded 8×8 transform unit in HM-5.0, where diagonal, horizontal and vertical scanning patterns are shown.
Figure 1:
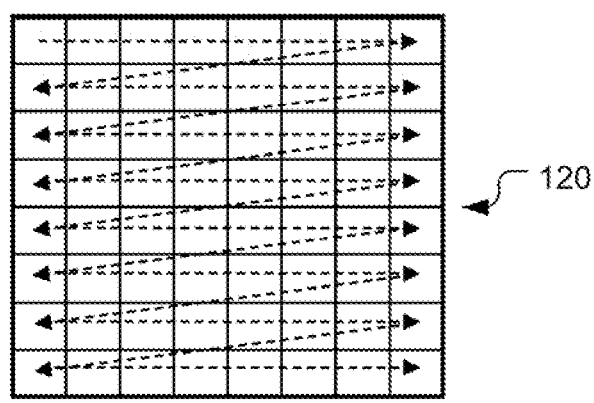
Figure 1:
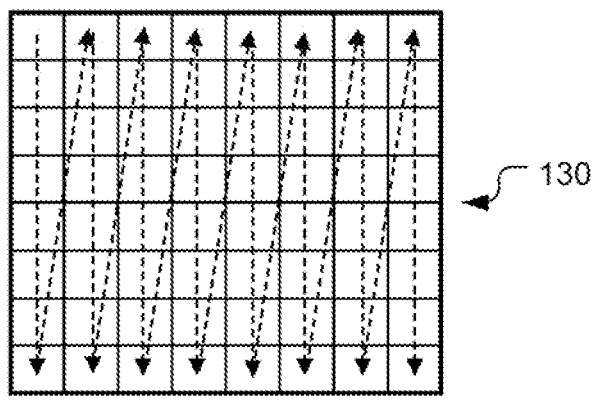
Figure 2:
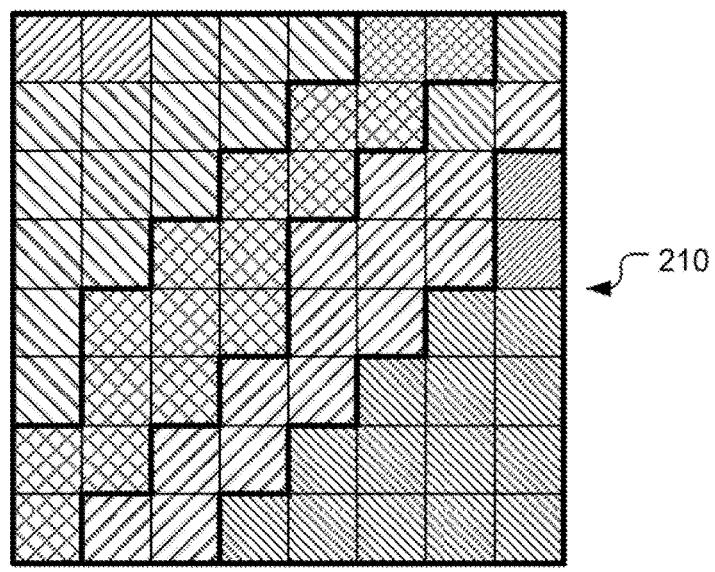
FIG. 2 illustrates the four subsets in an inter-coded 8×8 transform unit in HM-5.0.
Figure 3:
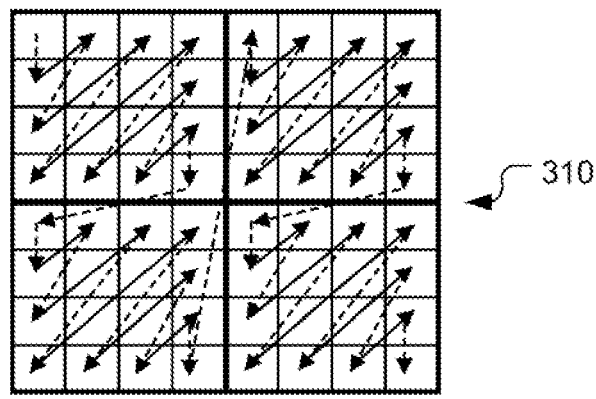
FIG. 3 illustrates two examples of first-layer scan orders, where the first-layer scan order is used as the processing order of the four 4×4 sub-blocks of an 8×8 transform unit.
Figure 3:
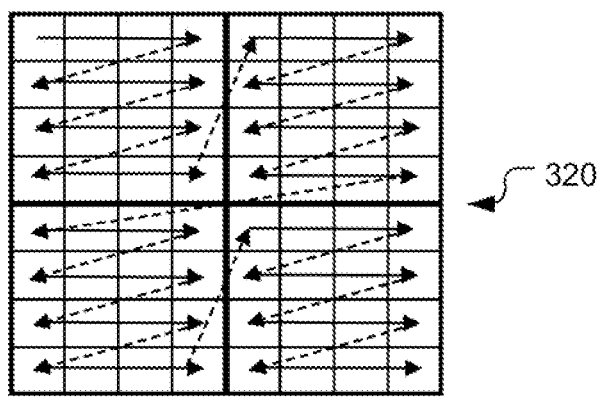
Figure 3:
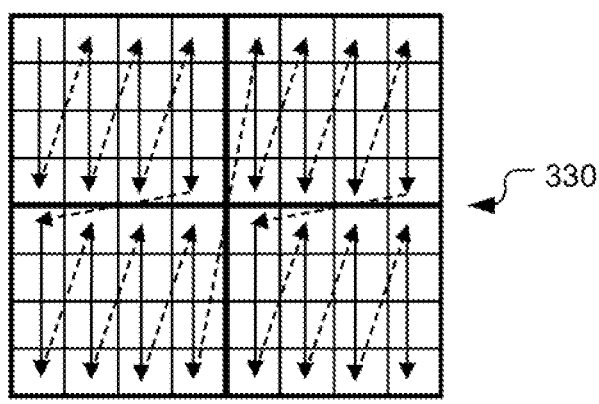

Each of the double scanning patterns shown in FIG. 3 for the 8×8 TU is formed by applying two-layer scanning using the same scanning pattern, where the first-layer scanning is associated with the scanning order of the four 4×4 sub-blocks divided from the 8×8 TU and the second-layer scanning is associated with the scan pattern within each 4×4 sub-block. For example, pattern 310 of FIG. 3 illustrates an example of applying the diagonal scanning pattern across the four sub-blocks and within each of the 4×4 sub-block. As shown in pattern 310 of FIG. 3, each of the 4×4 sub-blocks uses the diagonal scan pattern. Furthermore, diagonal scanning is also used as processing order across the tour 4×4 sub-blocks. Accordingly, the upper-left sub-block is scanned first, and followed by lower-left, upper-right and lower-right sub-blocks. In pattern 320 of FIG. 3, each of the 4×4 sub-blocks uses the horizontal scan pattern. Furthermore, horizontal scanning is also used as processing order across the four 4×4 sub-blocks. Accordingly, the upper-left sub-block is scanned first, and followed by upper-right, lower-left and lower-right sub-blocks. Similarly, pattern 330 of FIG. 3 illustrates an example of vertical scanning across the four 4×4 sub-blocks and within each of the four 4×4 sub-blocks.

Figure 4:
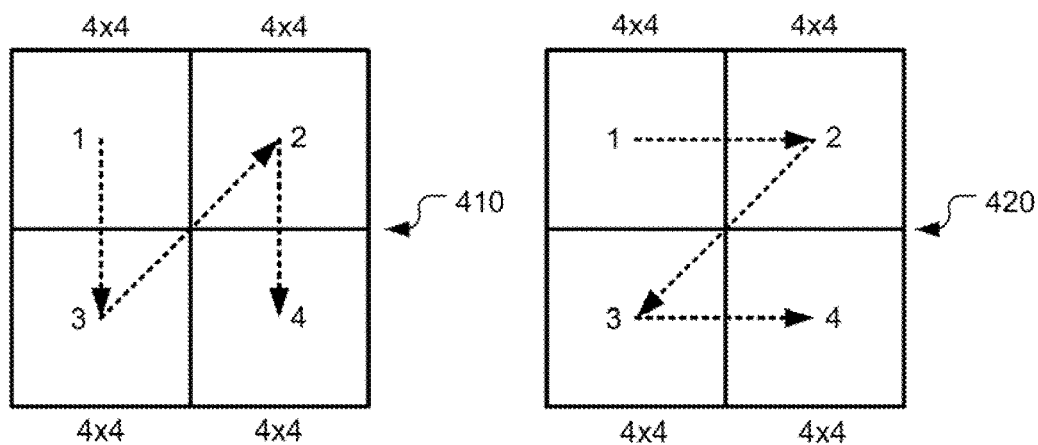
FIG. 4 illustrates three examples of two-layer scanning for intra-coded or inter-coded 8×8 transform units according to an embodiment of the present invention.

FIG. 3 illustrates examples of two layer scanning patterns using the same scanning pattern for both layers. The first layer scanning pattern involves the processing order across the four 4×4 sub-blocks, i.e., four 4×4 TUs. It is noted that the four 4×4 sub-blocks in a 8×8 TU are arranged in a 2×2 shape. In the examples of FIG. 3, the first 4×4 scanning starts from the upper-left 4×4 sub-block, and ends at the lower-right corner 4×4 sub-block. While the scan order the first-layer scanning) is always the same as the scanning pattern (i.e., the second-layer scanning) of the underlying 4×4 sub-blocks, the scanning for the two layers may also be selected independently. In FIG. 4, each box of the 2×2 boxes 410 and 420 represents a 4×4 sub-block. A vertical scan order is shown for 2×2 boxes 410 and a horizontal scan order is shown for 2×2 boxes 420. It is noted that the diagonal scan for 2×2 boxes is the same as the vertical scan in this case. The diagonal scan order and vertical scan order for the first layer will be different for square TUs with size greater than 8×8 and for certain non-square TUs (e.g. 32×8 TU). For some other non-square TUs (e.g. 4×16 TU and 16×4 TU), diagonal, horizontal, and vertical scan order applied in the first layer are all the same. In some embodiments of the present invention, the first-layer scanning is selected independently from the second-layer scanning. For example, the vertical scanning order 410 can be used while each underlying 4×4 sub-block is scanned using horizontal scanning. All examples mentioned above always use the same scanning, pattern for the four 4×4 sub-blocks. However, the four 4×4 sub-blocks may use different scanning patterns.

In the above example, an 8×8 TU is used to illustrate two-layer coefficient scanning, where the 8×8 TU is divided into four 4×4 sub-blocks. However, the present invention is not limited to the 8×8 TU. A skilled person in the art may practice the present invention for 16×16 or 32×32 TUs or non-square TUs.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software code, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software code and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for processing 2N×2N transform units, the method comprising:
   receiving a 2N×2N transform unit (TU) that corresponds to an intra-coded TU or an inter-coded TU, wherein N is an integer from a group consisting of 2, 4, 8, or 16;
   dividing the 2N×2N TU into four N×N sub-blocks;
   determining a first-layer scanning order among said four N×N sub-blocks of the 2N×2N TU, wherein said four N×N sub-blocks of the 2N×2N TU are scanned based on the first-layer scanning order;
   determining a second-layer scanning pattern for said four N×N sub-blocks, wherein each of said four N×N sub-blocks is scanned according to the second-layer scanning pattern; and
   providing scanned 2N×2N transform coefficients for the 2N×2N TU corresponds to the intra-coded TU or the inter-coded TU using double scanning based on the first-layer scanning order and the second-layer scanning pattern,
   wherein said determining the first-layer scanning order is dependent on the second-layer scanning pattern,
   wherein the first-layer scanning order is selected from a set of scanning orders including at least a first scanning order and a second scanning order, wherein the first scanning order is different from the second scanning order,
   wherein the second-layer scanning pattern is selected from a set of scanning patterns including at least a first scanning pattern, a second scanning pattern, and a third scanning pattern, wherein the first scanning pattern, the second scanning pattern, and the third scanning pattern are different from one another,
   wherein the first-layer scanning order is selected to be the first scanning order when the second-layer scanning pattern is determined to be the first scanning pattern,
   wherein the first-layer scanning order is selected to be the first scanning order when the second-layer scanning pattern is determined to be the third scanning pattern, and
   wherein the first-layer scanning order is selected to be the second scanning order when the second-layer scanning pattern is determined to be the second scanning pattern.

2. The method of claim 1, wherein the first-layer scanning order scans an upper left N×N sub-block first and scans a lower right N×N sub-block last.

3. The method of claim 1, wherein the second-layer scanning pattern is selected from a group consisting of diagonal scanning, horizontal scanning and vertical scanning.

4. The method of claim 3, wherein the first-layer scanning order is from an upper-left sub-block, to an upper-right sub-block, to a lower-left sub-block and to a lower-right sub-block if the second-layer scanning pattern is the horizontal scanning.

5. The method of claim 3, wherein the first-layer scanning order is from an upper-left sub-block, to a lower-left sub-block, to an upper-right sub-block and to a lower-right sub-block if the second-layer scanning pattern is the diagonal scanning or the vertical scanning.

6. The method of claim 1, wherein said determining the second-layer scanning pattern is dependent on an intra prediction mode associated with the 2N×2N TU if the 2N×2N TU is the intra-coded TU.

7. An apparatus for processing 2N×2N transform units, the apparatus comprising:
processing circuitry configured to:
receive a 2N×2N transform unit (TU) that corresponds to an intra-coded TU or an inter-coded TU, wherein N is an integer from a group consisting of 2, 4, 8, or 16;
divide the 2N×2N TU into four N×N sub-blocks;
determine a first-layer scanning order among said four N×N sub-blocks of the 2N×2N TU, wherein said four N×N sub-blocks of the 2N×2N TU are scanned based on the first-layer scanning order;
determine a second-layer scanning pattern for said four N×N sub-blocks, wherein each of said four N×N sub-blocks is scanned according to the second-layer scanning pattern; and
provide scanned 2N×2N transform coefficients for the 2N×2N TU corresponds to the intra-coded TU or the inter-coded TU using double scanning based on the first-layer scanning order and the second-layer scanning pattern,
wherein determining the first-layer scanning order is dependent on the second-layer scanning pattern,
wherein the first-layer scanning order is selected from a set of scanning orders including at least a first scanning order and a second scanning order, wherein the first scanning order is different from the second scanning order,
wherein the second-layer scanning pattern is selected from a set of scanning patterns including at least a first scanning pattern, a second scanning pattern, and a third scanning pattern, wherein the first scanning pattern, the second scanning pattern, and the third scanning pattern are different from one another,
wherein the first-layer scanning order is selected to be the first scanning order when the second-layer scanning pattern is determined to be the first scanning pattern,
wherein the first-layer scanning order is selected to be the first scanning order when the second-layer scanning pattern is determined to be the third scanning pattern, and
wherein the first-layer scanning order is selected to be the second scanning order when the second-layer scanning pattern is determined to be the second scanning pattern.

8. The apparatus of claim 7, wherein the first-layer scanning order scans an upper left N×N sub-block first and scans a lower right N×N sub-block last.

9. The apparatus of claim 7, wherein the second-layer scanning pattern is selected from a second group consisting of diagonal scanning, horizontal scanning and vertical scanning.

10. The apparatus of claim 9, wherein the first-layer scanning order is from an upper-left sub-block, to an upper-right sub-block, to a lower-left sub-block and to a lower-right sub-block if the second-layer scanning pattern is the horizontal scanning.

11. The apparatus of claim 9, wherein the first-layer scanning order is from an upper-left sub-block, to a lower-left sub-block, to an upper-right sub-block and to a lower-right sub-block if the second-layer scanning pattern is the diagonal scanning or the vertical scanning.

12. The apparatus of claim 7, wherein the processing circuitry is configured to determine the second-layer scanning pattern dependent on an intra prediction mode associated with the 2N×2N TU if the 2N×2N TU is the intra-coded TU.

13. A non-transitory computer-readable medium including instructions that, when executed by one or more processors, cause the one or more processors to:
receive a 2N×2N transform unit (TU) that corresponds to an intra-coded TU or an inter-coded TU, wherein N is an integer from a group consisting of 2, 4, 8, or 16;
divide the 2N×2N TU into four N×N sub-blocks;
determine a first-layer scanning order among said four N×N sub-blocks of the 2N×2N TU, wherein said four N×N sub-blocks of the 2N×2N TU are scanned based on the first-layer scanning order;
determine a second-layer scanning pattern for said four N×N sub-blocks, wherein each of said four N×N sub-blocks is scanned according to the second-layer scanning pattern; and
provide scanned 2N×2N transform coefficients for the 2N×2N TU corresponds to the intra-coded TU or the inter-coded TU using double scanning based on the first-layer scanning order and the second-layer scanning pattern,
wherein said determining the first-layer scanning order is dependent on the second-layer scanning pattern,
wherein the first-layer scanning order is selected from a set of scanning orders including at least a first scanning order and a second scanning order, wherein the first scanning order is different from the second scanning order,
wherein the second-layer scanning pattern is selected from a set of scanning patterns including at least a first scanning pattern, a second scanning pattern, and a third scanning pattern, wherein the first scanning pattern, the second scanning pattern, and the third scanning pattern are different from one another,
wherein the first-layer scanning order is selected to be the first scanning order when the second-layer scanning pattern is determined to be the first scanning pattern,
wherein the first-layer scanning order is selected to be the first scanning order when the second-layer scanning pattern is determined to be the third scanning pattern, and
wherein the first-layer scanning order is selected to be the second scanning order when the second-layer scanning pattern is determined to be the second scanning pattern.

14. The non-transitory computer-readable medium of claim 13, wherein the first-layer scanning order scans an upper left N×N sub-block first and scans a lower right N×N sub-block last.

15. The non-transitory computer-readable medium of claim 13, wherein the second-layer scanning pattern is selected from a group consisting of diagonal scanning, horizontal scanning and vertical scanning.

16. The non-transitory computer-readable medium of claim 13, wherein the first-layer scanning order is from an upper-left sub-block, to an upper-right sub-block, to a lower-left sub-block and to a lower-right sub-block if the second-layer scanning pattern is the horizontal scanning.

* * * * *